April 12, 1927.

E. H. COLPITTS 1,624,537

OSCILLATION GENERATOR

Filed Feb. 1, 1918

Inventor:
Edwin H. Colpitts.
by J.E.Roberts Att'y.

Patented Apr. 12, 1927.

1,624,537

UNITED STATES PATENT OFFICE.

EDWIN H. COLPITTS, OF EAST ORANGE, NEW JERSEY, ASSIGNOR TO WESTERN ELECTRIC COMPANY, INCORPORATED, OF NEW YORK, N. Y., A CORPORATION OF NEW YORK.

OSCILLATION GENERATOR.

Application filed February 1, 1918. Serial No. 214,971.

Figure 1:
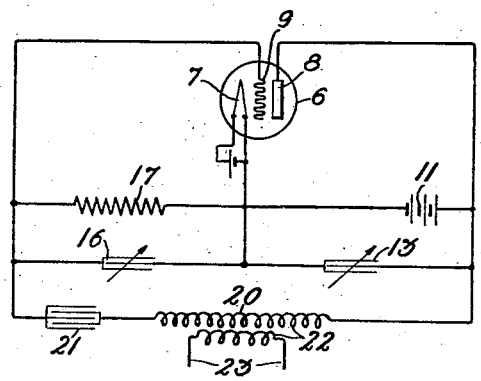
Figure 2:
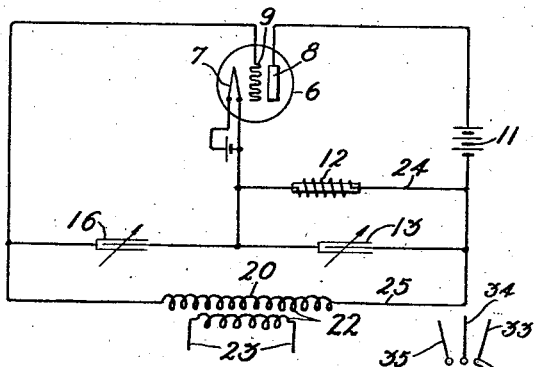
Figure 3:
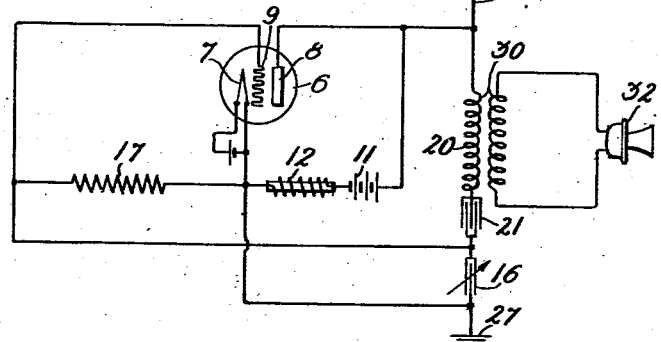

It is known that a vacuum tube of the audion type may be employed as a generator of oscillations of any desired frequency by providing a tuned circuit suitably associated with the tube circuits, usually called input and output circuits. In previous generators the coupling between the input and output circuits has been electro-magnetic. In accordance with this invention, the couplings between the input circuit and the oscillation circuit and between the output circuit and the oscillation circuit are made electrostatic. Some of the advantages of this arrangement are herein enumerated. One advantage of this form of generator is that the generation of oscillations of a frequency not determined by the period of the tuned circuit is prevented. Another advantage is that it enables the generator to be connected to an antenna in a transmitting system without causing any part of the generator to be short-circuited. This and other novel advantages will be most readily understood by reference to the following detailed description taken in connection with the accompanying drawings, in which Fig. 1 represents one form of the generator of this invention; Fig. 2 is a modification of Fig. 1; and Fig. 3 illustrates how the generator may be associated with a transmitting antenna.

Referring to Fig. 1, 6 is an evacuated vessel of the audion type containing a filament 7, an anode 8, and a grid or impedance varying element 9. In the output circuit of the vessel is included a source of voltage 11, shunted by a condenser 13. This source of voltage, for the arrangement shown in this figure, should preferably be of such impedance for the frequencies generated that no appreciable short-circuiting of capacity 13 results therefrom. In the input circuit is included a capacity 16 and a high resistance 17 which in the arrangement shown is in shunt to the capacity. Suitably connected to the input and output circuits is an inductance 20, which cooperates with the condensers 13 and 16 to form an oscillatory circuit. A stopping condenser 21 of large capacity is placed in this circuit to prevent the flow of direct current. This oscillating circuit is coupled to both the output and input circuits of the vessel, whereby the vessel may function as a generator of oscillations of any frequency, depending upon the values of inductance and capacity in the oscillating circuit.

The operation of the system may be explained as follows:

Assume that a slight disturbance is impressed upon the grid 9. Corresponding changes but of greater amplitude will then occur in the output circuit current from the source of voltage 11. Due to the mutual capacity reactance 13 between the output circuit and the oscillating circuit, these current changes in the output circuit will set up oscillations in the oscillating circuit of a period determined by the amount of inductance and capacity in the circuit. The current in the oscillating circuit will create an alternating current voltage drop across the terminals of the condenser 16, and since this condenser is common to both the input circuit and the oscillating circuit, the alternating voltage will be impressed between the grid 9 and the filament 7. This voltage will then cause corresponding current variations in the output circuit as explained above, so that the cycle of operations will be repeated and the tube will be caused to generate oscillations of constant amplitude and of a frequency determined by the tuning of the oscillating circuit. These oscillations may be impressed in any suitable manner, as by a transformer 22, upon a work circuit 23, whereby the oscillations may be employed for any of the well-known uses of an alternating current.

A choke coil may be inserted in the output circuit in series with the battery 11 to prevent an excessive amount of alternating current from being shunted around the condenser 13. The high resistance 17 is provided between the grid and the filament to permit the leakage of any excess charge which may tend to accumulate on the grid and block the action of the tube.

It has been found that one of the disadvantages to the operation of oscillation generators, is that, due to the electrostatic relation between the grid and anode of a vacuum tube, there is a tendency of the tube to generate undesirable oscillations of a frequency determined by the tuning coil in the oscillating circuit and by the effective capacity between the grid and anode. Such undesirable oscillations are prevented in an oscillator of the type embodied in this invention, since oscillations that would tend to be set up by the circuit composed of the inductance 20 and of the electrostatic capacity between the anode 8 and grid 9 would be short-circuited by the capacities 13 and 16 which are very much larger in value than the effective capacity between the grid and anode.

Fig. 2 is a modification of Fig. 1 in which the circuit arrangement is such that the stopping condenser 21 and the resistance 17 may be omitted. This is accomplished by placing the battery 11 between the junction point of branches 24 and 25 and the anode. The presence of resistance 17 is unnecessary because there is a direct current path from the grid to the filament through inductance 20 and choke coil 12.

Fig. 3 illustrates how the capacity of a transmitting antenna may be substituted for one of the condensers of the oscillator system without in anywise interfering with the operation or efficiency of the oscillator by short-circuiting any part of the apparatus, as would be the case in oscillators of other types. Herein the antenna capacity, as shown, has been substituted for the condenser 13 of Fig. 1. This is accomplished by grounding filament 7 at the point 27 and by connecting the antenna 28 to the anode 8. The antenna is shown to be composed of a plurality of parts, 33, 34 and 35, either or all of which may be connected to the system by the switch 36, thereby providing means whereby the capacity of the antenna with respect to earth may be varied. Or the period of oscillation may be varied by varying the amount of effective inductance in coil 20, the other coil of transformer 30 being simultaneously varied if desired. The system oscillates in the same manner as described above and oscillations of a predetermined frequency are radiated by the antenna. The amplitude of the oscillations of the antenna may be varied in any well-known manner in accordance with signals that are to be transmitted. One way of accomplishing this is to employ the inductance 20 as the secondary of a transformer 30, the primary coil of which is associated with a transmitting device 32. With this arrangement the amplitude of the oscillations in the antenna will be varied in accordance with the movements of the diaphragm of transmitter 32. The system will then act as a radiating system for the signals it is desired to transmit.

This invention is not limited to use with any particular kind of discharge device, it merely being essential that a discharge device be used which has a cathode, an anode and some kind of an impedance-varying element for controlling the current between the electrodes. The circuit arrangements shown and described are merely by way of example and are not intended to limit the invention, which is defined in the claims, nor is the illustration of one form of signaling system intended to suggest any limitation as to the field of utility of the invention, which is capable of various applications.

What is claimed is:

1. Means for generating oscillations and transmitting them to a work circuit, comprising an evacuated vessel having an input circuit and an output circuit, and an oscillating circuit including separate means for associating said oscillating circuit electrostatically separately with said input and output circuits.

2. In combination, a work circuit, means for generating oscillations and transmitting the generated oscillations to said work circuit, comprising an evacuated vessel having an input and an output circuit, and an oscillating circuit, said input and output circuits each having a capacity common thereto and to said oscillating circuit.

3. A generating system comprising a discharge device having an input circuit, an output circuit and an oscillation circuit connected thereto, said oscillation circuit including separate means for connecting said oscillation circuit electrostatically separately with said input and output circuits.

4. A system for converting electrical energy into the energy of oscillating currents comprising an oscillatory circuit in which oscillations are to be produced, an electron discharge device having input and output circuits, said input and output circuits each including in common with said oscillatory circuit a capacity external to said device.

5. Means for generating oscillations, comprising an evacuated vessel containing a cathode, an anode and a third electrode, and an oscillating circuit having a capacitatively reactive path between said third electrode and said cathode and a separate capacitatively reactive path between said anode and said cathode.

6. Means for generating oscillations, comprising an evacuated vessel containing a cathode, an anode and a third electrode; and an oscillating circuit containing a capacity between said third electrode and said cathode, and a capacity between said anode and said cathode, and a shunt around said capacities including an inductance.

7. Means for generating oscillations, comprising a discharge device having a cathode, an anode and an impedance varying element; an oscillating circuit having the two said electrodes and the impedance varying element connected each to a different point thereof a source of voltage and a path from said cathode to said anode for the direct current therefrom, exclusive of said oscillatory circuit.

8. Means for generating oscillations and transmitting them to a work circuit, comprising a discharge device having a cathode, an anode and an impedance varying element, and a path between said impedance varying element and said anode having two portions, the reactance of each portion of which decreases with increase in the frequency, each of said portions being included between the cathode and a different one of the other mentioned electrodes, said path as a whole, forming part of a closed oscillatory circuit.

9. An oscillation generator comprising an evacuated vessel containing a cathode, an anode and a third electrode, a source of voltage, a path between said cathode and said anode for the direct current therefrom, a circuit composed substantially entirely of inductive reactance connected between said third electrode and said anode, and a capacitatively reactive path between said third electrode and said anode to which the cathode is connected at an intermediate point.

10. An oscillation generator comprising a discharge device having a cathode, an anode and an impedance varying element, a source of voltage and a path between said cathode and said anode for the direct current therefrom, and an impedance path between said anode and said impedance varying element the impedance of which decreases with increase in frequency, said cathode being connected to an electrically intermediate point of said path, said path as a whole forming part of a series oscillating circuit.

11. An oscillation generator comprising a discharge device having an input and an output circuit, an oscillating circuit comprising a capacity which is common thereto and to said input circuit, a capacity which is common thereto and to said output circuit, and an inductance shunting said capacities, one of said capacities consisting of the capacity of a radiating antenna.

12. An oscillation generator comprising a discharge device having a cathode, an anode and an impedance varying element, a capacity between said cathode and anode comprising a radiating antenna, a capacity between said impedance varying element and said cathode, and an oscillatory circuit, said capacities constituting elements of said oscillating circuit.

13. An oscillation generator comprising a discharge device having an anode, a cathode and an impedance varying element, a coupling reactance, a lead from said cathode to a point in said coupling reactance, a lead from said anode to said coupling reactance, a lead from said impedance varying element to said coupling reactance, a second reactance opposite in kind to said coupling reactance and in effective shunt to at least a portion of said coupling reactance, and a radiating element, said coupling reactance comprising the reactance of said radiating element.

14. An oscillation generator comprising an oscillation circuit and a discharge device having an anode, a cathode and an impedance varying element; a path between said anode and said cathode, a capacity reactance common to said path and said circuit, a second path between said impedance varying element and said cathode, a second capacity reactance common to said second path and said circuit, a third path between said impedance varying element and said anode, and an inductive reactance common to said third path and said circuit.

15. A system comprising an electron discharge device, an electron emitting cathode, an anode and an impedance varying means constituting elements of said device; a circuit in which oscillations are to be generated comprising an inductance and a plurality of condensers in series included in a circuit between two of said elements, and a separate connection from a point intermediate said condensers to the other of said elements.

16. A signal transmission system comprising an antenna circuit having a thermionic discharge device connected thereto, an anode, an electron emitting cathode and a control element for said device; an inductance and a capacity in said antenna circuit; leads from said anode, cathode and control element respectively to said antenna circuit, at least a portion of said inductance being included between said anode and control element leads, and said capacity being included between said cathode and control element leads.

17. A signal transmitting system comprising an antenna circuit having a thermionic discharge device connected thereto, an anode, a cathode and a control element for said device; an inductance and a capacity in said antenna circuit; leads from said anode, cathode and control element respectively to said antenna circuit, at least a portion of said inductance being included between said anode and control element leads, said capacity being included between said cathode and control element leads, and the capacity in said antenna being included between said anode and cathode leads.

18. An oscillation generator comprising an oscillating circuit and a discharge device having a cathode, an anode and an impedance varying element, impedance paths between said impedance varying element and said cathode and between said cathode and said anode the reactance of each of which is capacitative at the frequency generated by said generator, each of said paths forming a different part of the same series oscillating circuit.

19. An oscillation generator comprising a discharge device, elements of said device being an anode, a cathode, and an impedance varying means, a branched path between two of said elements, one branch of said path being inductively reactive at the generated frequency, another branch, and a connection between said third element and an intermediate point of said other branch, the portions of said other branch between said intermediate point and said two of said elements each being capacitatively reactive at the generated frequency.

20. An oscillation generator comprising a discharge device, an anode, a cathode, and an impedance varying element for said device, a circuit comprising an inductance and a plurality of capacities, a connection from a point in said circuit between two of said capacities to said cathode, a connection from the opposite terminal of one of said capacities to said element, and a conductive connection from said anode to said cathode, said connection including a source of electromotive force.

21. An oscillation generator comprising a discharge device, an anode, a cathode, and an impedance varying element for said device, and a circuit arrangement coupled to said device including a plurality of capacities wherein oscillations are generated by said device, one of said capacities being so connected to a circuit between said anode and cathode as to introduce capacitative reactance thereinto, and another of said capacities being so related to the circuit between said impedance varying element and said cathode so as to introduce capacitative reactance thereinto.

22. An oscillation generator comprising a discharge device having an anode, a cathode and an impedance varying element, a circuit arrangement including a plurality of capacities coupled to said device for determining the frequency of oscillations and wherein oscillations are to be produced, one of said capacities being included in a circuit between said cathode and impedance varying element, and the other of said capacities being effectively in series with respect to the circuit between said anode and said cathode.

23. In an electrical signaling system, an evacuated vessel containing two cold and one hot electrode, an oscillating circuit comprising an inductance and a plurality of condensers in series connected across the terminals thereof, connected across said cold electrodes, and a separate connection between all of said condensers and said hot electrode.

In witness whereof, I hereunto subscribe my name this 18th day of January, A. D. 1918.

EDWIN H. COLPITTS.